Jan. 8, 1929.  1,698,146

C. P. STRITE

BREAD TOASTER

Filed July 10, 1926   4 Sheets-Sheet 1

Inventor
C. P. Strite.
By Whiteley and Ruckman
Attorneys

Jan. 8, 1929.

C. P. STRITE 1,698,146

BREAD TOASTER

Filed July 10, 1926    4 Sheets-Sheet 2

Inventor:
C. P. Strite.
By Whiteley and Ruckman
Attorneys

Jan. 8, 1929.  C. P. STRITE  1,698,146
BREAD TOASTER
Filed July 10, 1926   4 Sheets-Sheet 3

Inventor:
C. P. Strite.
By Whiteley and Ruckman
Attorneys.

Jan. 8, 1929.　　　　　　C. P. STRITE　　　　　1,698,146
BREAD TOASTER
Filed July 10, 1926　　　4 Sheets-Sheet 4

Inventor
C. P. Strite.
By Whiteley and Ruckman
Attorneys.

Patented Jan. 8, 1929.

1,698,146

UNITED STATES PATENT OFFICE.

CHARLES P. STRITE, OF MINNEAPOLIS, MINNESOTA.

BREAD TOASTER.

Application filed July 10, 1926. Serial No. 121,693.

My invention relates to bread toasters. An object is to provide an automatic electric bread toaster which is of compact arrangement and which is economical in manufacture so that it is particularly adapted for domestic or household use.

The full objects and advantages of my invention will appear in connection with the detailed description thereof, and the novel features of my inventive idea will be particularly pointed out in the claims.

Figure 1:
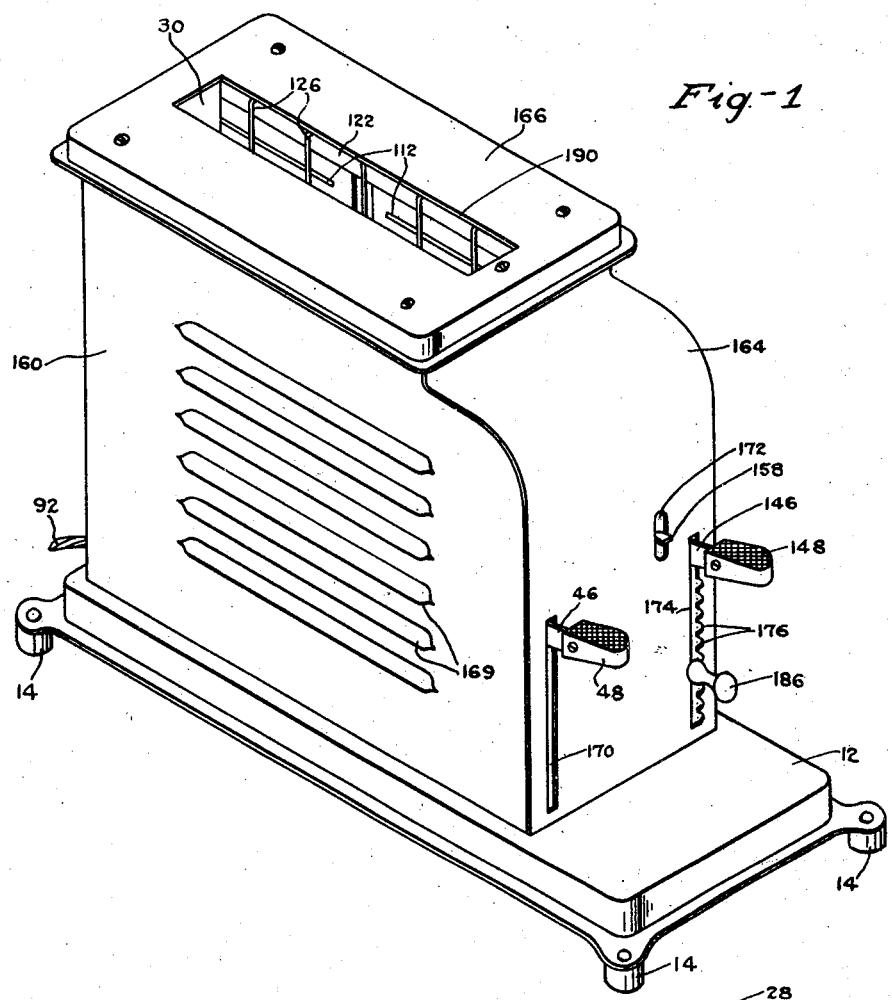
Figure 2:
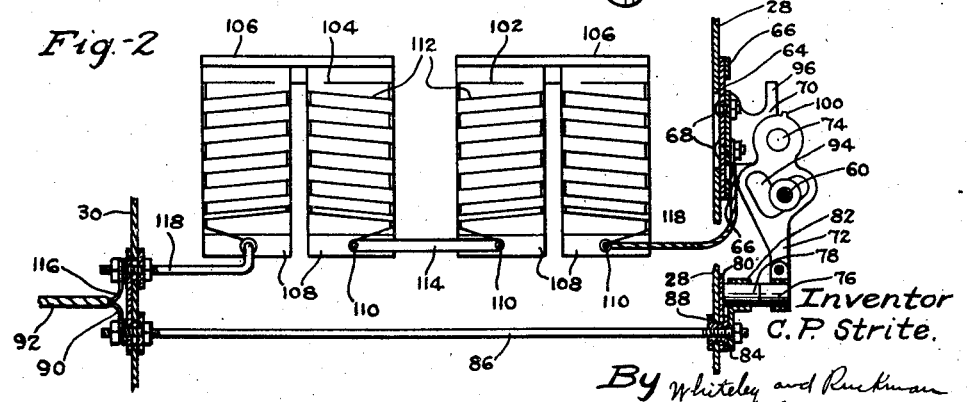
Figure 3:
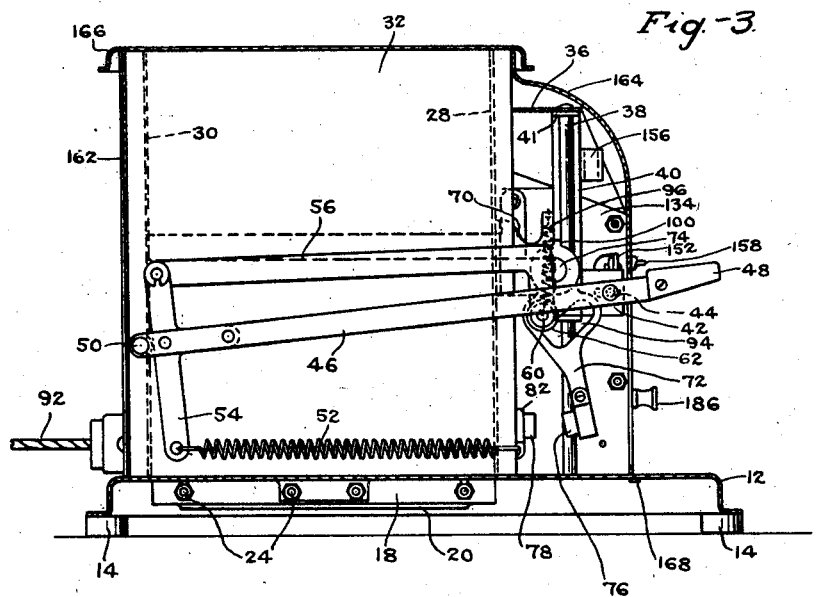
Figure 4:
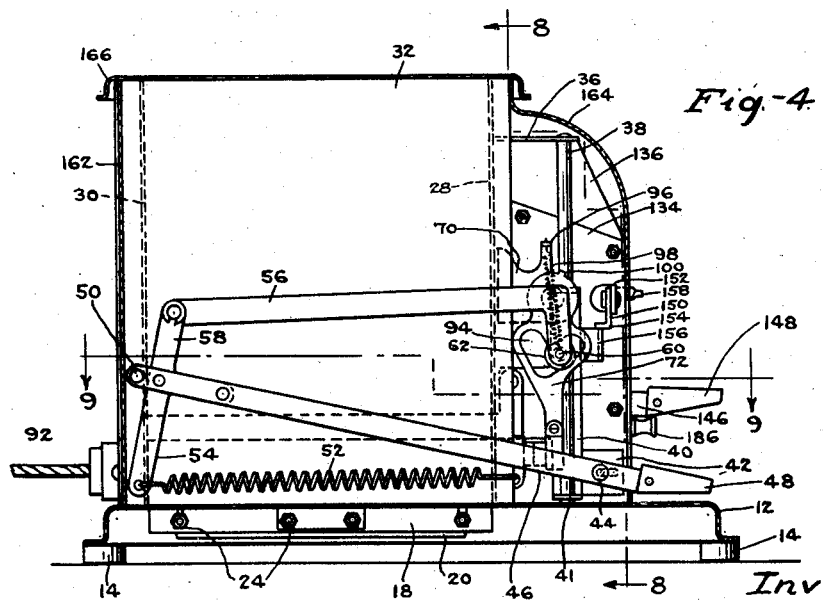
Figure 5:
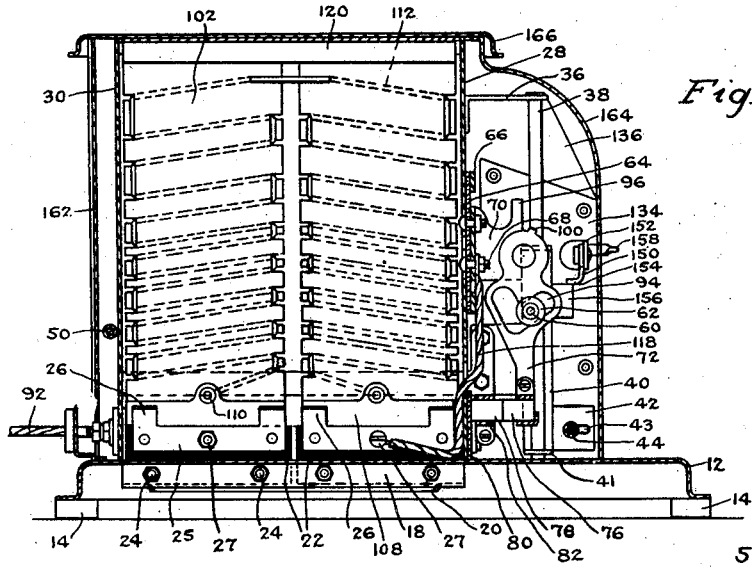
Figure 6:
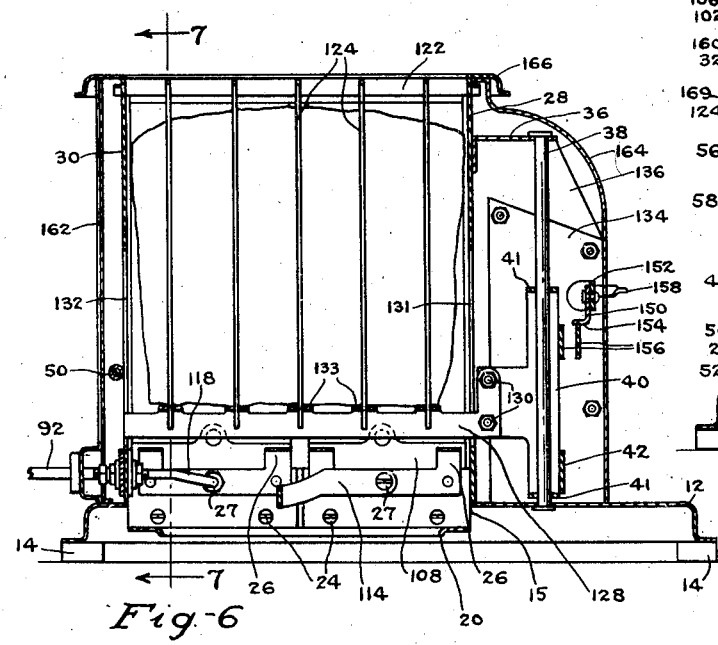
Figure 7:
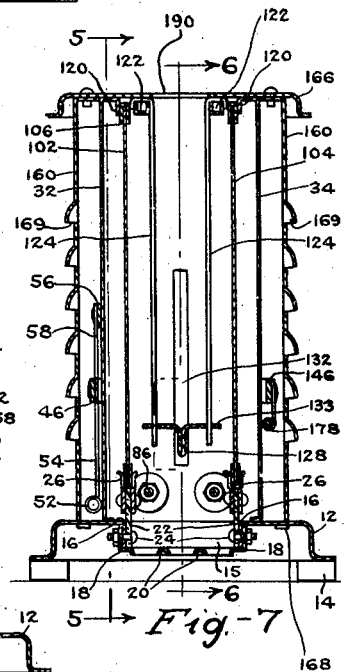
Figure 8:
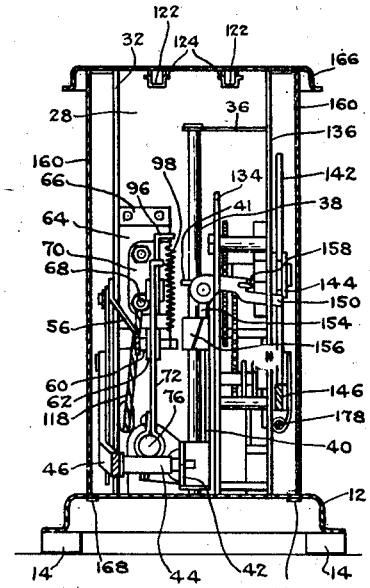
Figure 9:
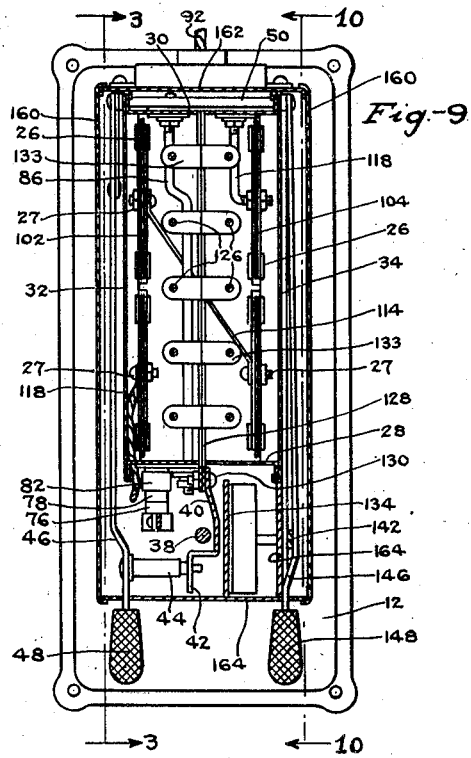
Figure 10:
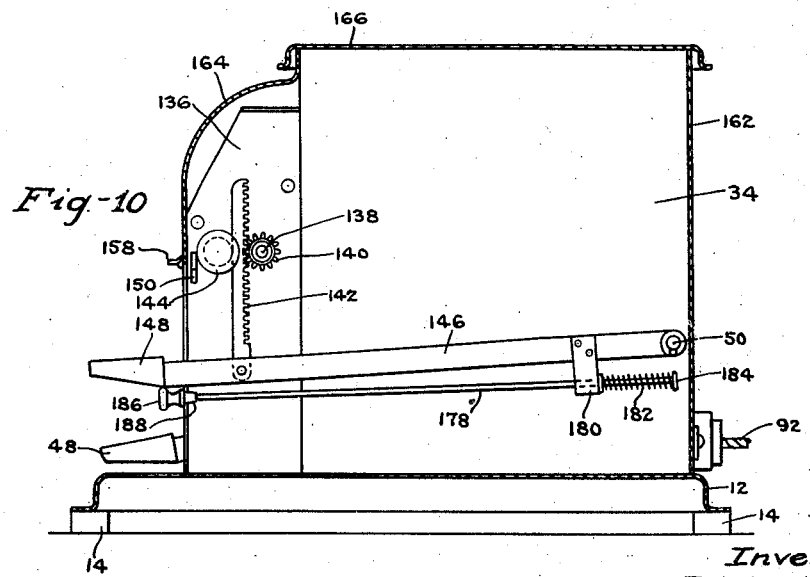

In the accompanying drawings which illustrate a practical embodiment of my invention,—
Fig. 1 is a view of the device in perspective. Fig. 2 is a diagrammatic view illustrating the electrical connections. Fig. 3 is a view in vertical section on the line 3—3 of Fig. 9 with the switch open. Fig. 4 is a view like Fig. 3 except that the switch is closed. Fig. 5 is a view in vertical section on the line 5—5 of Fig. 7. Fig. 6 is a view in vertical section on the line 6—6 of Fig. 7. Fig 7 is a view in vertical section on the line 7—7 of Fig. 6. Fig. 8 is a view in section on the off-set line 8—8 of Fig. 4. Fig. 9 is a view in horizontal section on the line 9—9 of Fig. 4. Fig. 10 is a view in vertical section on the line 10—10 of Fig. 9.

As shown in the drawings, I provide a base which consists of an upwardly pressed plate 12 supported by feet 14 at the four corners. The plate 12 contains a longitudinal slot 15 at the sides of which are downwardly extending flanges 16 as best shown in Fig. 7. Upwardly extending flanges 18 of a slotted plate 20 engage the outer sides of the flanges 16, the inner sides of which are engaged by strips 22 of insulating material secured by bolts 24 passing therethrough and through both sets of flanges. Strips 25 carry upwardly extending pairs of clips 26 for holding heating elements which will be referred to later. The strips 25 are secured to the insulating strips 22 by bolts 27. A front end plate 28 is secured at its lower end to the base plate 12 while a rear end plate 30 is also secured at its lower end to this base plate. Side plates 32 and 34 are secured to said end plates. The side plates and the end plates constitute an inner casing which encloses a toasting chamber or compartment. A bracket 36 extends forwardly from the front plate 8. A vertical rod 38 is secured to the inner front corner of this bracket and to the base plate 12. This rod constitutes a guide for an irregular shaped plate 40 which has perforated ears 41 at its top and bottom for sliding move-
ment on the rod. The plate 40 has an offset projection 42 at its lower end containing a slot 43 as shown in Fig. 5, this slot receiving the end of a pin 44. The pin 44 projects out from a lever 46 which at its front end has a finger piece 48 and at its rear end is pivoted on a rod 50 which passes through flanges on the end plate 30 and holds the side plates 32 and 34 from being pulled up from the base plate as will be obvious from Figs. 3 and 9. A coiled spring 52 attached to the lower end of an arm 54 extending down from the rear portion of the lever 46 tends to hold this lever up in the position shown in Fig. 3. A bar 56 is pivotally attached at its rear end to the upper end of an arm 58 extending up from the lever 46. An outstanding pin 60 is secured to the front end of the bar 56 and a fiber spool-like member or flanged roller 62 is rotatably mounted on this pin. A strip 64 of insulating material is secured to the front end plate 28 by strips 66 fastened to said plate. As best shown in Fig. 2, the plate 28 has a slot cut therein over which the insulating strip 64 is secured this slot preventing contact between the plate 28 and two bolts 68 by means of which a bracket 70 is secured to the insulating strip. A switch arm 72 is attached to the bracket 70 by a pivot 74 and the lower end of this arm carries a carbon contact 76 adapted to be engaged with a fixed carbon contact 78 whose rear end rests against a piece 80 of insulating material. The contact 78 is held in a split sleeve 82 formed at one end of an arm 84, the other end of which is perforated to receive the front end of a conducting rod 86 which passes through a sleeve 88 of insulating material held in a perforation in the front plate 28 as shown in Fig. 2. The rear end of the rod 86 is insulatively held by the rear plate 30 as shown in the last mentioned view, and one wire 90 of a supply cable 92 is connected with said rod. The cable 92 may be connected with any convenient source of electrical energy. The intermediate portion of the arm 72 is widened and provided with a V-shaped slot 94 which receives the fiber roller 62 previously referred to. The bracket 70 has an upwardly extending projection 96 provided with an out-turned end to which the upper end of a coiled spring 98 is attached, the lower end of this spring being attached to the inner end of the pin 60 as best shown in Fig. 8. By comparing Figs. 3 and 4, it will be understood that when the lever 46 is depressed, the roller 60 will be moved from the position shown in Fig. 3 into that shown in Fig. 4 and as soon as the roller passes the dead center constituted by the shoulder on the upper margin of the slot, the spring 98 will pull the contact 76 into engagement with the contact 78 with a quick, snappy action. When the lever 46 is raised the contact 76 will be disengaged with the same kind of action. The upper end of the arm 72 is provided with a stop 100 which engages the projection 96 for limiting the retraction of the contact 76. A pair of heating elements 102 and 104 such as shown in Fig. 2 are positioned inside of the vertical plates 32 and 34 as shown in Figs. 7 and 9. Each heating element consists of mica sheets held together in spaced relation in a common plane by a binding strip 106 at the top. Each mica sheet at the bottom is provided with a binding strip 108 and eyelets 110 which serve to secure the ends of heating wires 112 which are wrapped helically upon the mica sheets with their convolutions spaced from each other while at the tops of the sheets, the wires pass from one sheet to the other sheet of the pair, being held in place by passing through holes in the mica. The heating element 102 is connected with the heating element 104 by a conducting strip 114 which connects the forward bolt 27 of the element 104 with the rear bolt 27 of the member 102 as best shown in Fig. 9, it being noted that the strip 114 passes from one side of the toasting compartment to the other. The second wire 116 of the cable 92 is connected to a rod 118 insulatively supported by the rear plate 30 and having its inner end formed so as to constitute the rear bolt 27 associated with the heating element 104 as will be understood from Fig. 9. The front bolt 27 of the heating element 102 is connected by an insulated wire 118 to one of the bolts 68 by which the bracket 70 is secured. The path of the electric current through the heating elements when the switch is closed will now be obvious especially in connection with Fig. 2. The heating elements are detachably held at the bottom by the clips 26 which engage the binding strips 108. At the top, the heating elements are kept in vertical position due to the fact that the binding strips are engaged on one side by flanges 120 formed at the top of the side plates 32 and 34 and are engaged on the other side by U-bars 122 which rest in notches cut in the top of the two end plates 28 and 30 as will be apparent from Fig. 8 in which the U-bars are shown with out-turned flanges 124 which prevent them from misplacement which would result from longitudinal sliding movement. A number of vertical guide rods 126 have hooked upper ends which fit into notches in the flanges of the two U-bars 122. A bread carrier is attached to the sliding plate 40 for movement up and down therewith. This bread carrier includes a longitudinal bar 128 which is secured to the plate 40 by bolts 130 and it extends through vertical slots 131 and 132 in the front and rear plates 28 and 30 respectively so as to be guided for vertical movement. The bar 128 has side arms 133 extending from both sides and provided with perforations through which the rods 124 pass so that the arms 133 may slide up and down and at the same time the lower portions of the rods are held in vertical position. Two vertical plates 134 and 136 are supported on the base in front of the plate 28 and extending forwardly at right angles thereto. Mounted between these two plates is a clockwork mechanism having a winding shaft 138 upon the end of which a gear 140 is secured as best shown in Fig. 10. A rack arm 142 meshes with the gear 140 and the teeth are held in engagement with each other by a roller 144 mounted on the plate 136 and engaging the edge of the rack arm which is opposite the toothed edge thereof. This rack arm is pivotally attached at its lower end to the forward portion of a lever 146 which at its front end has a finger piece 148 and at its rear end is pivotally mounted on the rod 50, previously referred to. A gravity dog 150 is pivotally attached to a lug 152 carried by the plate 134. One end of this dog projects through a slot in the plate 136 so as to be above and in the path of the lever 146 when the latter approaches its uppermost position and whereby this end of the dog is lifted so as to tilt the dog. The other end of the dog has a backwardly bent member 154 adapted to cooperate with which is a projection 156 extending frowardly from the upper portion of the slidable plate 40. The projection 156 is bent twice at right angles and has a downwardly inclined edge as shown in Fig. 8 so that when the lever 46 is pushed down carrying the plate 40 therewith, the projection 156 will slide past the end member 154 of the gravity dog in case the outer end of the latter is not held upwardly on account of the lever 146 being in raised position. The dog has a forward projection 158, the purpose of which will presently appear. The operative parts of the device which have thus far been described are surrounded by an outer casing which not only gives the device the ornamental appearance shown in Fig. 1 but also serves to hold some of the parts in place. This outer casing consists of two similar side walls 160, a rear wall 162, a front wall 164, and a top plate 166. The walls are secured at the bottom to the base plate 12 in suitable manner as by means of tongues 168 passed through slots in said plate and then bent over. The walls are held together at the top by screws passing through the top plate 166 and through flanges on the upper ends of the walls, as will be understood from Figs. 1 and 7 which also show that the top plate prevents the guide wires 124 from moving upwardly out of place. The side walls contain slots 169 thereby avoiding a closed air pocket. The front wall of the outer casing contains a slot 170 for movement of the lever 46, a slot 172 for movement of the projection 158 and a slot 174 for movement of the lever 146, one edge of the latter slot being provided with teeth 176. As best shown in Fig. 10, a rod 178 is slidably mounted in a guide 180 extending down from the lever 146. A coiled spring 182 interposed between the guide 180 and an enlargement 184 on the rear end of the rod 178 tends to hold this rod in rearward position. A knob 186 is secured to the front end of the rod 178 while adjacent this knob the rod has an enlargement 188 which engages between the teeth 176 but is sufficiently large so that it cannot be slid directly from one tooth to another. Upon pulling forwardly on the knob 186, the enlargement 188 is disengaged from the teeth and the knob may then be moved up or down so as to constitute an adjustable stop for determining the lowermost position into which the lever 146 may be moved. The top plate 166 is provided with a slot 190 for insertion of the slice of bread which is to be toasted.

The operation and advantages of my invention will be apparent in connection with the foregoing description, it being understood that when the cable 90 is connected with a source of electrical energy and the switch is closed, current will flow through the heating elements in the manner readily understood from Fig. 2. Assuming the switch to be open, as shown in Fig. 3, a slice of bread is inserted through the slot 190 so as to rest upon the arms 133 of the bread carrier, the lever 146 is pushed down to an extent determined by the adjustable stop 186 as shown in Figs. 4 and 10, thereby winding the spring of the clockwork mechanism and the lever 46 is pushed down until the projection 156 engages under the end 154 of the pivoted gravity dog 150. The downward movement of the lever 46 lowers the bread carrier upon which the slice of bread rests and also causes the switch to be closed in the manner previously described in detail. When the apparatus has been set in this manner, the lever 146 will be gradually drawn upwardly by the clockwork mechanism, and when the lever strikes the outstanding arm of the dog 150, the latter is tripped so as to release the projection 156, thereby causing the lever 46 to be quickly pulled up by the spring 52. The upward movement of the lever 46 causes the switch to be opened and the toasted bread is lifted partly out of the toasting compartment, thus permitting it to be readily grasped. It is to be noted that if the lever 46 is pushed down without also pushing down the lever 146, then the lever 46 will not stay down since the dog 150 is at this time held in its tilted position. There is, therefore, no liability of the switch remaining closed for more than the toasting period. Furthermore, if for any reason, it is desired to open the switch before the lever 146 reaches its upper position, this can be readily accomplished by lifting the projection 158, thereby tilting the dog 150 and releasing the projection 156. Since the slot 15 in the base plate 12 is directly underneath the toasting compartment, crumbs will not be retained within the device but may be caught in a tray upon which the toaster is placed. The plates 32 and 34 constitute baffles and are made of thin metal as will be apparent from Fig. 7 so that during the toasting of the first slice, they become heated to their full extent and during the toasting of the subsequent slices continue to radiate the same amount of heat. Without the use of these baffle plates, it was found that the outside casing became heated gradually to its full extent and that the heat radiated therefrom would then toast the slices of bread to a greater degree of brownness than the first slice unless the timing period was shortened. By the use of the baffle plates, this objection is avoided.

I claim:

1. A bread toaster comprising a base plate, an inner casing mounted on said base plate, electric heating means supported in said inner casing, means for supporting bread in toasting position adjacent said heating means, a switch connected with said heating means and mounted outside of said casing, means for manually closing said switch, means for automatically opening said switch after a predetermined length of time, and an outer casing mounted on said base plate and surrounding said inner casing and switch.

2. A bread toaster comprising a casing, electric heating means supported in said casing, means for supporting bread in toasting position adjacent said heating means, a switch connected with said heating means, a gravity dog supported outside of said casing and arranged to hold said switch in closed position, clockwork mechanism mounted outside of said casing, a timing lever supported outside of said casing, and connections between said clockwork mechanism and said lever for winding said mechanism by movement of said lever in one direction, said lever when moved into initial position by said clockwork mechanism serving to tilt said dog and thereby cause said switch to open.

3. A bread toaster comprising a casing, electric heating means supported in said casing, means for supporting bread in toasting position adjacent said heating means, a switch connected with said heating means, a switch arm pivoted to the outside of said casing and carrying the movable member of said switch, means for normally holding said switch arm in open position, a gravity dog temporarily holding said switch arm in closed position, and timing mechanism which operates said dog for releasing said switch arm when the toasting operation is completed.

4. A bread toaster comprising an inner casing, electric heating means supported in said casing, means for supporting bread in toasting position adjacent said heating means, a switch connected with said heating means, a gravity dog supported outside of said casing and arranged to hold said switch in closed position, clockwork mechanism mounted at the front of said casing, a lever outside of said casing and pivoted at the rear end thereof, connections between said clockwork mechanism and said lever for winding said mechanism by depression of said lever, an outer casing spaced around said inner casing and containing a slot in its front wall through which said lever extends, a rod slidably carried by said lever, a spring for holding said rod rearwardly, and a stop member carried by said rod adapted to be adjustably positioned in said slot for limiting the downward movement of said lever, said lever when moved into initial position by said clockwork mechanism serving to tilt said dog and, thereby, cause said switch to open.

5. A bread toaster comprising a support, clips carried by the bottom portion of said support sheetlike electric heating elements adapted to be detachably engaged by said clips, means for supporting bread in toasting position adjacent said heating elements and a top plate engaging the upper ends of said elements and removably attached to said support whereby said elements may be withdrawn upon removing said top plate.

6. A bread toaster comprising a support, sheetlike electric heating elements carried by said support, means for supporting bread in toasting position adjacent said heating elements, a normally open switch connected with said heating elements, a vertical rod held by said support, a slide mounted for movement on said rod into switch-closing position, a dog engaging said slide when in such position for temporarily holding said switch in closed position, and timing mechanism which operates said dog for releasing said slide when the toasting operation is completed.

7. A bread toaster comprising a support, sheetlike heating elements carried by said support, means for supporting bread in toasting position adjacent said heating elements, a normally open switch connected with said heating elements, a dog for temporarily holding said switch in closed position, timing mechanism which operates said dog after a predetermined length of time for opening said switch, and means whereby said switch may be manually opened before the expiration of said predetermined length of time.

In testimony whereof I hereunto affix my signature.

CHARLES P. STRITE.